US012700385B2

(12) United States Patent
Korfker

(10) Patent No.: US 12,700,385 B2
(45) Date of Patent: Aug. 4, 2026

(54) SHOULDER MEMBER AND PIPE MEMBER CONNECTING STRUCTURE

(71) Applicant: Gustav Pirazzi & Comp. GmbH, Offenbach (DE)

(72) Inventor: Berent Korfker, Moray (GB)

(73) Assignee: GUSTAV PIRAZZI & COMP. GMBH & CO. KG, Offenbach (DE)

( * ) Notice: Subject to any disclaimer, the term of this patent is extended or adjusted under 35 U.S.C. 154(b) by 157 days.

(21) Appl. No.: 18/277,335

(22) PCT Filed: Feb. 15, 2022

(86) PCT No.: PCT/EP2022/053581
§ 371 (c)(1),
(2) Date: Aug. 15, 2023

(87) PCT Pub. No.: WO2022/175223
PCT Pub. Date: Aug. 25, 2022

(65) Prior Publication Data
US 2024/0127771 A1 Apr. 18, 2024

(30) Foreign Application Priority Data
Feb. 16, 2021 (EP) .................................... 21157355

(51) Int. Cl.
*G10D 3/18* (2020.01)

(52) U.S. Cl.
CPC ..................................... *G10D 3/18* (2013.01)

(58) Field of Classification Search
None
See application file for complete search history.

(56) References Cited

U.S. PATENT DOCUMENTS 252,923 A * 1/1882 Becker ..................... G10D 3/18 84/278
3,631,754 A * 1/1972 Kun ......................... G10D 3/18 984/124

(Continued)

FOREIGN PATENT DOCUMENTS

DE 100 07 834 A1 5/2007
DE 20 2014 009627 2/2015

(Continued)

OTHER PUBLICATIONS

JP Patent application No. 2023-547273, mailed Aug. 23, 2029, Notice of Refusal.

*Primary Examiner* — Patrick McAtee
(74) *Attorney, Agent, or Firm* — FBT Gibbons LLP; Alexander J. Johnson

(57) ABSTRACT

A shoulder rest (30) for a stringed instrument with a support element (32) extending in a longitudinal direction (L) for resting on the shoulder and/or chest of the player, on which a number of hinged clamping units (34) are arranged, is intended to be adaptable in a particularly simple manner to different geometric requirements. For this purpose, the shaft (50) of the or each clamping unit (34) is mounted in each case by means of integrally formed pivot pins (58) in an associated pivot bearing (55), the bearing shells (60) of which are designed in accordance with the invention in each case in the form of an arc segment which does not engage around or enclose the pivot pin (58) completely, but only over a certain arc length. The shaft is preferably positioned off-center and thus enables particularly simple and fast dimensional adjustments.

5 Claims, 8 Drawing Sheets

(56) References Cited

U.S. PATENT DOCUMENTS

| | | | | |
|---|---|---|---|---|
| 3,683,098 | A * | 8/1972 | Chavez, Jr. | G10D 3/18 84/278 |
| 4,062,695 | A | 12/1977 | Pieck | |
| 4,333,378 | A * | 6/1982 | Hrdlicka | G10D 3/18 84/280 |
| 5,270,474 | A * | 12/1993 | Kun | G10D 3/18 84/280 |
| 5,419,226 | A * | 5/1995 | Kun | G10D 3/18 84/280 |
| 5,731,531 | A | 3/1998 | Kun et al. | |
| 6,670,533 | B1 | 12/2003 | Yeh | |
| 7,265,284 | B2 | 9/2007 | Muir et al. | |
| 7,488,877 | B2 | 2/2009 | Cheng et al. | |
| 7,888,569 | B2 | 2/2011 | Penic | |
| 9,311,903 | B1 * | 4/2016 | Balatti | G10D 1/02 |
| 2003/0167896 | A1 | 9/2003 | Vanden et al. | |
| 2005/0016355 | A1 * | 1/2005 | Huang | G10D 3/18 84/328 |
| 2007/0044630 | A1 * | 3/2007 | Muir | G10D 3/18 84/279 |
| 2008/0196570 | A1 | 8/2008 | Cheng | |
| 2009/0211426 | A1 | 8/2009 | Penic | |
| 2013/0125728 | A1 * | 5/2013 | Korfker | G10D 3/18 84/280 |
| 2013/0276611 | A1 * | 10/2013 | Vochezer | G10D 3/18 84/280 |
| 2020/0394987 | A1 * | 12/2020 | Thorn | G10D 3/18 |
| 2021/0280158 | A1 * | 9/2021 | Farha | G10D 3/18 |
| 2021/0366444 | A1 * | 11/2021 | Korfker | G10D 3/18 |
| 2024/0331664 | A1 * | 10/2024 | James | G10D 1/02 |

FOREIGN PATENT DOCUMENTS

| | | | |
|---|---|---|---|
| EP | 0507 994 | A2 | 10/1992 |
| EP | 27 17 255 | A1 | 3/2019 |
| EP | 3 018 653 | A1 | 5/2021 |
| EP | 3913617 | A1 | 11/2021 |
| JP | 55-166696 | A | 12/1908 |
| JP | T-04-503577 | A | 6/1992 |
| JP | 2016-090997 | A | 5/2016 |
| JP | 2020-067549 | A | 4/2020 |

* cited by examiner

SHOULDER MEMBER AND PIPE MEMBER CONNECTING STRUCTURE

TECHNICAL FIELD

The invention relates to a shoulder rest for a stringed instrument, in particular for a violin or viola, with a support element for placing on the shoulder and/or chest of the player. It further relates to a clamping unit for such a shoulder rest.

BACKGROUND

Stringed instruments, especially violins and violas (German: Bratschen), the latter also known as violas, are held at their body end between the musician's chin and shoulder when playing. However, since the distance between the player's head and the shoulder area is usually greater than the thickness of the instrument, it is only possible for the musician to hold or clamp the instrument in a very uncomfortable position, so that—if it is possible to play the instrument at all—impairments to the quality of the playing cannot be avoided. To counteract this, so-called chin rests and shoulder rests for violins and violas have been developed.

These shoulder rests are removably attached to the body of the instrument with a holding device and thus serve to make it more comfortable for the musician to hold the instrument. Basically, a shoulder rest is attached to a violin or the like and forms a support surface that rests on the musician's shoulder, with the instrument itself supported at a selected level. This depends in particular on the physique, especially the neck length, the shoulder shape, and the violin position, of the musician. Such shoulder rests are known, for example, from EP 507 994 B1, U.S. Pat. No. 4,062,695, DE 100 07 834 A1, U.S. Pat. No. 7,265,284 or U.S. Pat. No. 7,488,877 B2.

The shoulder rests can be designed with a fixed base. However, this is usually insufficiently shaped according to the musician's shoulder and thus individualized, so that some losses in terms of playing comfort and convenience usually have to be accepted. For comfort reasons, however, the fixed base can also be provided with a cushion at the bottom, which rests against the musician's shoulder when the instrument is played.

The two ends of the base are usually fitted with upward-projecting clamping units designed as holding or supporting elements, which carry rotatable, fork-shaped holding clips as end pieces. These can be attached to the side walls of the instrument body near the bottom of the body. In order to be able to firmly attach this type of shoulder rest to the instrument, the bottom of the shoulder rest usually has a certain elasticity of its own, and this serves to generate a certain clamping force with which the fork-shaped holding clamps grip the instrument. End pieces are also known in other embodiments in combination with the support elements, but they usually all grip the instrument with a certain clamping action.

To ensure high-quality sound and harmony with the instrument, such shoulder rests are usually made of plastic or synthetic material, but more recently they have also been made of wood or wood-based materials, and their contours are at least approximately customized to the shape of the player's body. Among other things, this is intended to ensure that the player can play the instrument particularly comfortably and harmoniously and without impairing his concentration or attention.

EP 27 17 255 A1 also describes a shoulder rest of the type mentioned, with which a considerable improvement in the tonal properties of the ensemble of instrument and shoulder rest can be achieved. The support element of the shoulder rest is provided with a plurality of holes. This design of the support element makes the vibration behavior of the shoulder rest and the acoustic coupling to the vibration behavior of the instrument itself particularly favorable and low in interference, so that overall a particularly high tonal quality can be achieved when playing the instrument.

Such shoulder rests can basically be rigid, i.e., with permanently mounted clamping units. On the other hand, however, more and more foldable shoulder rests are being proposed whose holding elements or clamping units can be folded in to reduce the space required for storage. Such shoulder rests are known, for example, from EP 3 018 653 A1 or U.S. Pat. No. 7,488,877.

Regardless of the question of a hinged design, the general aim with such shoulder rests is to enable a particularly extensive adaptation of the geometry to the respective stringed instrument on the one hand, but also to the individual needs and specifications of the player on the other.

SUMMARY

The invention is based on the task of providing a foldable shoulder rest for a stringed instrument which is further improved in this sense, and which allows particularly flexible and variable adaptation of the shoulder rest to the geometry of the stringed instrument on the one hand and to the personal requirements and specifications of the player on the other hand in a particularly simple, weight-saving manner which is efficient in terms of manufacture. Furthermore, a clamping unit for the shoulder rest that is particularly suitable for this purpose is to be described.

With regard to the shoulder rest, this task is solved in accordance with the invention by arranging a number of foldable clamping units on the support element, wherein the shaft of the or each clamping unit is mounted in each case by means of integrally formed pivot pins in an associated pivot bearing, the bearing shells of which are designed in each case in the manner of an arc segment which does not embrace or enclose the pivot pin completely, but only over a certain arc length.

The invention is based on the idea that a foldable design of the clamping units arranged on the support element can be achieved in a particularly simple way by means of a pivot bearing. In order to enable individualized adaptation to the requirements of the player and/or the geometry of the stringed instrument with this basic design, the individual components or parts of the clamping units and the support element could of course be individually manufactured in the manner of a custom-made product. However, this is considered rather undesirable in view of the comparatively high expense involved. In order to avoid such increased expense and still enable individualized adaptation, rather the components as such or in interaction with each other should offer flexible adjustment and adaptation options.

In a first step, the clamping units are designed to be interchangeable particularly easily. A variation of the geometry is then already possible by, for example, replacing one clamping unit with another clamping unit of different length, in particular different shaft length. Such simple interchangeability of the clamping units is achievable in that the pivot bearing is specifically designed for such an easier exchange, with its bearing shells only partially and not completely enclosing the pivot pins of the clamping unit mounted in them.

Advantageous embodiments of the invention are the subject of the subclaims.

In a particularly preferred further development, the openings in the bearing shells are selected, configured, and dimensioned in such a way that the pivot pins remain stably engaged, yet can be easily engaged and disengaged.

In the usual embodiment, the or each clamping unit is appropriately provided with a mounting clamp that can preferably be engaged with an edge running around the bottom of the stringed instrument and thus fixes the shoulder rest to the stringed instrument in cooperation with further clamping units. In a very particularly preferred embodiment, however, this component is also designed for flexible adaptability of the geometry. For this purpose, the clamping unit in a very particularly preferred embodiment is designed in several, preferably two, parts and comprises, on the one hand, the foot or shaft and, on the other hand, the mounting clamp designed separately therefrom, the foot or shaft and mounting clamp being connected to one another by means of a screw thread. Preferably, the mounting clamp is arranged on and supported by a threaded shaft which can be screwed into an internal thread integrated in the foot or shaft of the clamping unit. This makes it possible to modify the length of the clamping unit in a particularly simple manner by simply screwing the threaded shaft more or less far into the internal thread.

In an alternative or additional advantageous further development, the shaft of the respective clamping unit is also guided eccentrically or off-center in the sense that its central axis does not intersect the axis of rotation of the pivot bearing holding the clamping unit but passes it at a distance. This makes it possible to adjust the clear width of the holding clamps relative to each other in a particularly simple manner when the clamping units are folded out, by exchanging clamping units with different offsets relative to each other. In particular, it should be possible to select the clear width between the holding clamps in such a way that, as far as possible, reliable engagement of the holding clamps in the circumferential bottom edge of the stringed instrument is possible while applying a known but not excessive pretension to the components.

Surprisingly, the size of the pivot pin is particularly relevant for the function of the assembly comprising the clamping unit and the bearing shell. Indeed, a larger pivot pin allows a more nuanced choice of engagement torque. Preferably, the components and their dimensions are selected in such a way that engagement is easy, but the given safety and stability are high afterwards. If, however, the diameter is selected too large, the width of the roller body and thus the lowest position of the support is disadvantageously increased. Under these considerations, the following dimensioning is considered particularly advantageous: for the diameter of the pivot pin; minimum 1 mm, maximum 30 mm, preferably 5 mm-15 mm, particularly preferably 8 mm-12 mm.

In a particularly advantageous design, which is considered to be independently inventive, the shaft elements are provided in the form of a set comprising a plurality of shaft elements with different offsets. The change in the clear width between two mounting clamps in the opened state and thus a variation in the geometry parameters can be easily achieved by replacing the respective shaft element. Moreover, in a further advantageous embodiment, the components can also be designed symmetrically in such a way that, in addition to a first starting position, each shaft can also be mounted in a second orientation, rotated by 180° about its central axis, in the respective pivot bearing. Due to the eccentric, offset guidance of the central axis of the shaft, even such a rotation causes a change in the clear width of the holding clamps relative to one another. In addition, due to the off-center positioning of the threaded pins, the relative position of the shoulder rest relative to the violin can also be changed in a particularly simple way, but significantly, by a suitable choice of the shaft elements.

Expediently and for a particularly simple but nevertheless solid design, the shaft of the or each clamping unit is designed in its foot area in the manner of a roller body with an approximately cylindrical cross-section. In a particularly advantageous embodiment, the roller body is provided with an end piece that interacts with a stopper attached to the shoulder rest and forms a stop for swinging out the shaft. This ensures that the clamping unit is brought into a defined position when it is swung out and can be brought into engagement with the bottom edge of the stringed instrument in a correspondingly adapted manner.

In addition to the aforementioned stop function, the end piece enables very precise specification and differentiation of the angles in the unfolded state. For example, depending on how long the ensemble of shaft and rubber foot is, it influences how strong the leverage effect is that occurs when it is clamped to the violin. Increased leverage should be compensated for by a more inwardly inclined position of the shaft. In particular, it should be sized precisely to compensate for its varying leverage effect when clamped to the violin, depending on the length of the shaft and rubber foot ensemble. Increased leverage due to a longer shaft and rubber foot could be compensated, for example, by a more inwardly inclined position of the shaft. This in turn is achieved by means of an end piece that is individually dimensioned for each tilt leg version and is wider in this example case. A comparatively long leg is thus preferably assigned a comparatively wide end piece, and a short leg a narrow end piece. In this way, the angle in the unfolded state is integrated in the shaft element itself and is not dependent on the support itself.

The minimum width of the roller body is preferably dependent on and selected from the screw dimension used, in a preferred example M4. Theoretically, of course, M 3.5 or M 4.5 can also be used. This gives the following preferred dimensions: width minimum 4 mm-maximum 12 mm, preferably 5 mm-9 mm, particularly preferably 6 mm-7 mm.

The diameter of the roller body directly influences how far off-center the shaft can be arranged without being displaced outside the geometry of the roller body. A smaller body allows a smaller adjustment, a larger body a larger one. Surprisingly, it has been found that, particularly preferably, an off-center position of 5 mm is sufficient and should be provided for comprehensive adjustability of a violin support. This allows an adjustability of about 1 cm on each side of the support. With regard to the required material thicknesses, this results in a preferred diameter of 16 mm. In general, the following dimensions are submitted: Minimum 10 mm, maximum 50 mm. Preferably 13 mm-25 mm. Particularly preferred 15 mm-20 mm.

On the other hand, it should also be noted that as the diameter increases, the axis of the roller body is positioned increasingly further away from the support. This increases the minimum height of the support. However, a low setting is usually very desirable. Therefore, the particularly preferred dimension of the roller body is a result of required adjustability, minimum material thickness and minimum height of the support in its lowest position.

By the way, it is also possible to design the tilt leg so that the shaft for the rubber foot is placed outside the roller body. This would allow the support to be adapted to even wider instruments. However, such a tilting leg could only be used in the "wide" position because it cannot be locked and folded in the "narrow" position. Such a variant would be especially preferred for a viola model.

In general, particularly flexible supports are increasingly preferred. However, designing a support for this flexibility presents a certain challenge. A certain degree of flexibility normally also implies an instability. However, the design with clamping units and bearing shells in the version and dimensions now proposed allows the pivot pin to rotate during play in the bearing shell. Surprisingly, it has also been found that during this rotation the support legs (rubber feet) continue to hold the violin stably. This allows the support to be made of different materials or with different geometries, which makes it possible to adjust the flexibility very precisely to the wishes of the user.

Advantageously, the end piece is provided with an O-ring, preferably made of rubber, which is guided in a groove. On the one hand, this dampens the impact when the end piece comes into contact with the stopper. On the other hand, due to the plastic deformability of the O-ring, a certain elasticity of the connection and the contact between the end piece and the stopper as such is given. This design has an extraordinarily positive influence on the tonal quality of the ensemble as a whole, i.e., when the shoulder rest is attached to the stringed instrument by means of the clamping units. The elasticity of the O-ring, through which the mechanical contact is established in the area of the stop, results in microscopic resilient and liberating properties of this connection, which have a very positive effect on the sound quality of the instrument.

In an advantageous embodiment, and in particular due to suitable material selection and geometry, the shoulder rest is slightly flexible. This allows greater tone freedom and more ergonomic holding of the instrument. Even a slightly flexible design of the shoulder rest, however, shows the stopper and end point moving apart as a result of pressure applied to the support and when this pressure is removed again. When the stopper and end point meet again, an audible shock tone is generated, which should also be damped.

This damping can be achieved by a rubber layer or a rubber body. Ideally, this body is placed and dimensioned in such a way that when the support is clamped to the violin, the end piece and the stopper are in contact.

This can be achieved very well by means of the mentioned O-ring. Although the O-ring is primarily intended to dampen the aforementioned impact sound, the end piece and stopper should preferably contact each other under tension. Because slight acoustic vibrations can be generated at this contact point by passing sound waves, the flexibility of the O-ring has yet another positive influence. Surprisingly, the sound with the O-ring seems to be livelier than without.

In terms of tone, the size of the O-ring should therefore be selected with particular care. If it is too thick, an excess of "resonance" can occur; if it is too thin, it no longer sufficiently dampens the impact. In addition, the cord thickness (SD) is preferably chosen so that when the support is clamped to the violin, the O-ring is compressed so that the end piece and the stopper touch each other. Thus, a shallower groove requires a gentler material, while a deep groove requires a relatively harder material.

In addition, if a more resonating effect is desired, a dicker ring can be provided to make the contact between the stopper and end piece impossible.

In view of the above considerations, the following parameters are thus particularly preferred for the O-ring:

Cord thickness (SD) of the O-ring: maximum 3 mm, minimum 0.5 mm, preferably 1.5 mm-0.7 mm, especially preferred 1.2 mm-0.8 mm.

Compression of the cord thickness (SD) A: minimum 10% and maximum 60% of the cord thickness, preferably 20-50% of the cord thickness, particularly preferably 30-40% of the cord thickness. The inner diameter (ID) of the O-ring results preferably from the dimension of the end piece and depends on how tightly the ring is to be stretched in its groove around the end piece.

With regard to the clamping unit, the above-mentioned task is solved with a shaft provided with an internal thread for receiving a threaded shaft of an associated mounting clamp, which shaft is guided eccentrical or off-center in the sense that its central axis does not intersect the axis of rotation of an associated pivot bearing when mounted in the latter but passes it with an offset.

As a particularly preferred choice of material for the support element, wood, plastic, or synthetic material is provided. In an advantageous embodiment, the support element therefore also has a thickness of at least 2 mm and 10 mm, preferably of at least 3 mm and at most 7 mm, particularly preferably of at least 3.3 mm and at most 5 mm, if it is made of wood, and a thickness of at least 1.5 mm and at most 4.5 mm if it is made of plastic or synthetic material.

In order to ensure a particularly high level of wearing comfort and thus particularly favorable playability under these boundary conditions, the width of the support element is also advantageously selected. Advantageously, the width of the support element is at least 20 mm and at most 48 mm, particularly preferably at least 22 mm and at most 30 mm, preferably at least 24 mm and at most 28 mm.

The advantages achieved with the invention consist in particular in the fact that the above-mentioned design of the components, especially in combination of all the above-mentioned features with one another, makes it possible to achieve extensive flexibility in the dimensioning and geometric parameters of the shoulder rest at low cost and with low weight. Due to the eccentric or off-center design of the shaft axis of the clamping unit in combination with the bearing in bearing shells designed only in segments, the clear width of the holding clamps can be varied as well as the angle of the leg elements by simply exchanging the clamping units. In addition, or alternatively, the length of the respective clamping unit can be modified particularly easy by recourse to the screw connection between the shaft and the holding clamp and/or by simple exchange. In its entirety, therefore, a holding system for a shoulder rest is available that can be adapted to a wide range of geometric specifications.

Particularly in comparison with known adjustment systems for shoulder supports, the present solution achieves very fast, precise, and reliable adjustments of the support. Known mechanisms use screws and holes, which are not sufficiently precise and continue to be cumbersome to handle in practice. Other designs use metal rods and rubbers that wear over time and no longer hold reliably. Also, these metal rods can damage the violin. Still other systems use a lot of holes for the clamping units, which make the rest heavier and make changing the width take more time.

In addition, since the clear width can be adjusted without the need for screw connections and other removable components, the positioning can be carried out very close to the instrument if required.

In addition, the present design allows the clear width to be set in very fine increments. For example, in a preferred design, an adjustment in steps of 2 mm is provided. This step width results from the dimension of the smallest off-center placement of the shaft (in this case 1 mm). Theoretically, even smaller steps, e.g., 0.5 mm, are possible if the shaft is placed only 0.25 mm off-center.

By means of pierced pivot pins, it is also possible to achieve that the displacement of the shaft is visually very noticeable. The further away from the center the shaft is offset, the larger the opening in the pivot pin, which in turn is easy for the user to recognize.

BRIEF DESCRIPTION OF THE DRAWINGS

An embodiment of the invention is explained in more detail with reference to a drawing. Therein the following is shown:

FIG. 3 shows the shoulder rest as shown in FIG. 2 in ready-to-use state with clamping units folded out, FIG. 4. shows the shoulder rest as shown in FIG. 2 in storage state with clamping units folded in.

Identical parts are marked with the same reference numerals in all FIGURES.

DETAILED DESCRIPTION

Figure 1:
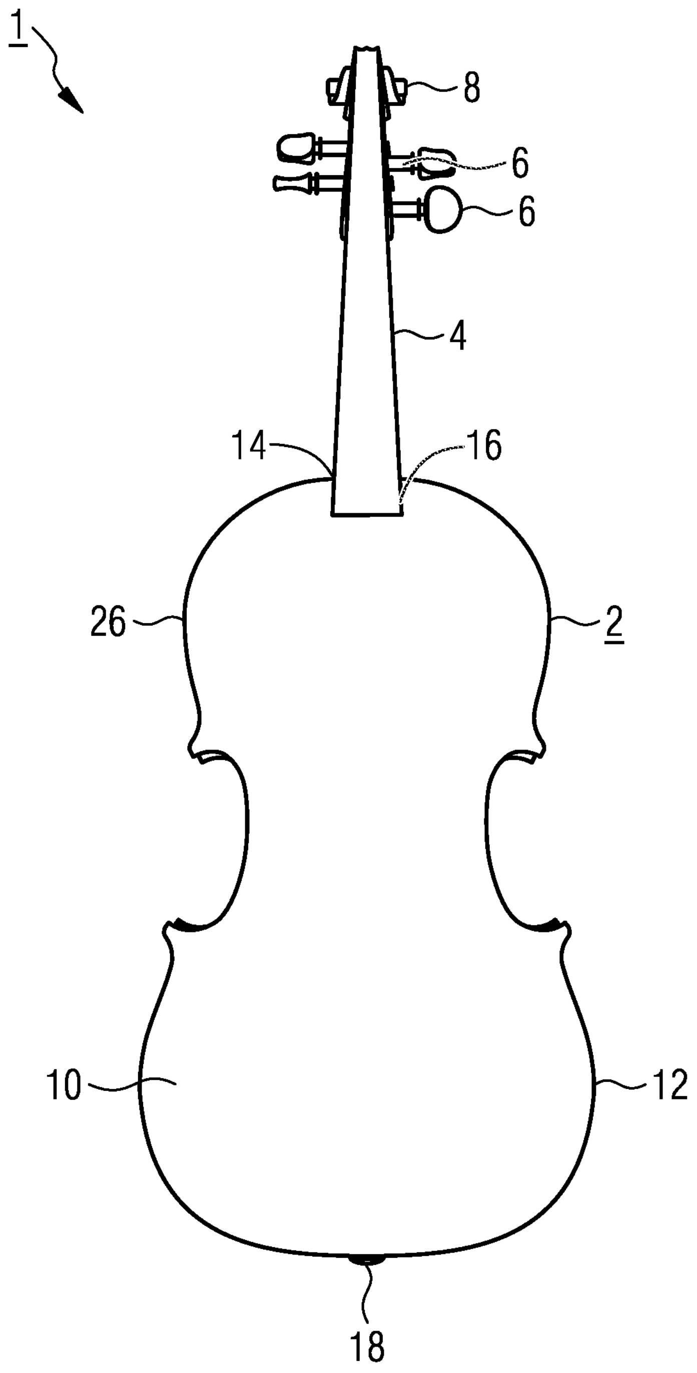
FIG. 1 shows a bottom view of a classical violin.

A classical violin 1 according to FIG. 1 comprises a body 2, which forms the resonance body, a neck 4, on which a fingerboard is mounted, and a pegbox with pegs 6, the end of which is formed by a scroll 8. The body 2 has a body bottom 10 and a circumferential bottom edge 12. At the neck end 14 of the body 2, the neck 4 of the violin 1 is connected to the body 2 via the upper end block 16. Other blocks that serve to stabilize the violin 1 are incorporated into the body 2.

At the lower end block 18, the strings of the violin 1 are braced with the help of a tailpiece end on the top of the violin 1. Therefore, the lower end block 18 is very stable and firmly incorporated into the body 2. The upper end block 16, which supports the neck 4 and the fingerboard, is also stable and firmly processed in the body 2. Nowadays, the upper end block 16 and the neck 4 are usually manufactured separately and glued together in order to fulfill the necessary wearing properties as well as sound and vibration characteristics.

On the side of the body bottom 10 in the area of the circumferential bottom edge 12, there are sidewalls, so-called ribs (German: Zargen) 26, and a body top is then attached to these ribs 26 opposite the body bottom. These parts essentially form the body 2, which is the resonance chamber of the violin 1, and are stabilized with the help of the so-called outer blocks and the upper and lower end blocks 16, 18.

Figure 2:
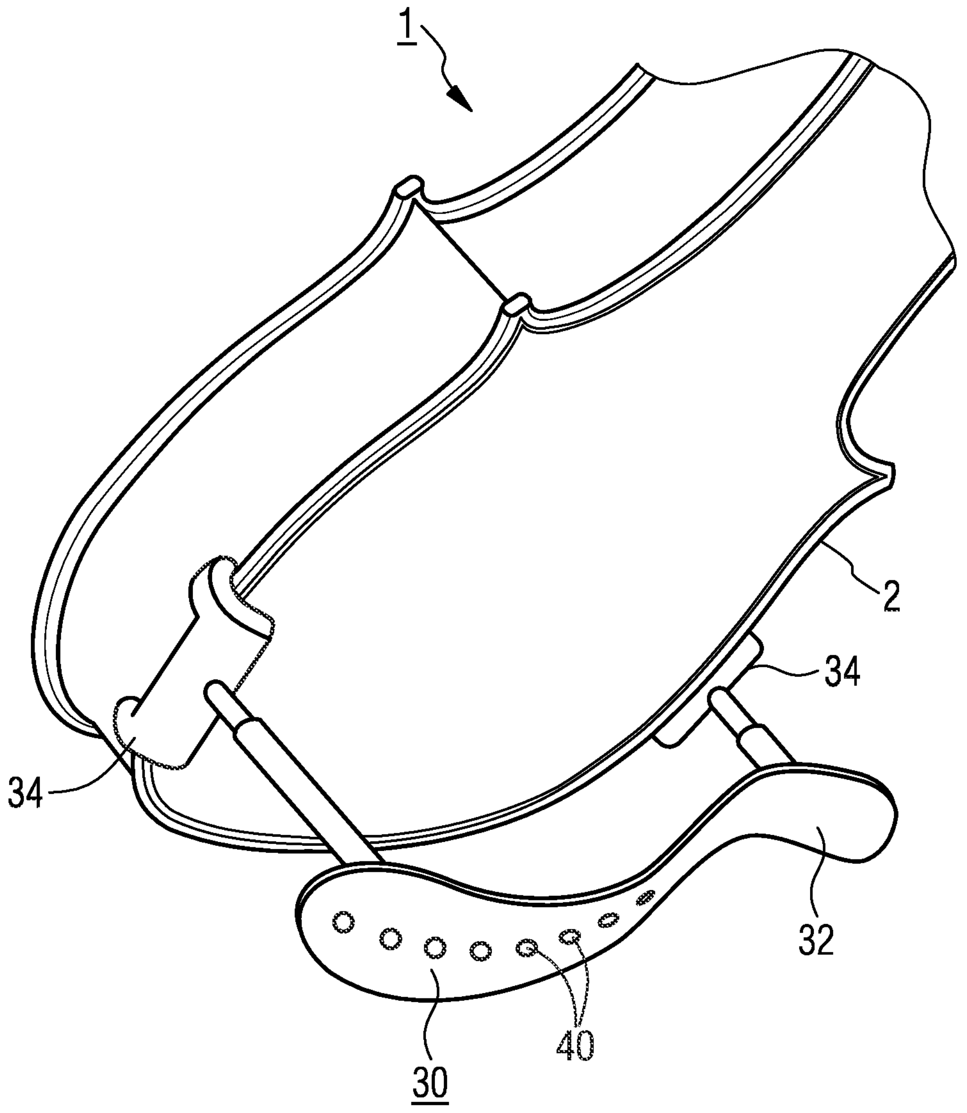
FIG. 2 shows a partial perspective view of the violin with an attached shoulder rest according to the prior art.

In order to enable the musician to maintain a comfortable posture while playing the violin 1 with high sound quality, a shoulder rest 30 is usually provided, as shown in FIG. 2 in mounted condition on the body 2 of the violin 1. The shoulder rest 30 in itself comprises a support element 32 for resting on the shoulder and/or chest of the player, which can be attached to the body 2 of the violin 1, in particular to the circumferential bottom edge 12, by means of clamping units 34 arranged at the ends. In the embodiment example, the shoulder rest 30 can thus be attached directly to the body 2 of the violin 1 via the clamping units 34; alternatively, however, the additional use of an adapter piece between the shoulder rest 30 and the body 2 could also be provided.

For particularly good playability with a high level of wearing comfort, the support element 32 of the shoulder rest 30 is contoured, whereby the shaping or contouring of the support element 32 provides for individualized adaptation to the respective player. In the embodiment, the support element 32 of the shoulder rest 30 is made of a suitably selected material, for example wood or plastic, with a view to good tonal properties, but also to keeping the weight as low as possible. In addition, however, for further improvement of the tonal properties, the support element 32 also has a pattern of suitably positioned and arranged holes 40 and/or slots, as is known, for example, from the not pre-published European Patent Application No. 20175545.1, the disclosure of which is expressly incorporated into the present disclosure ("incorporation by reference").

Figure 3:
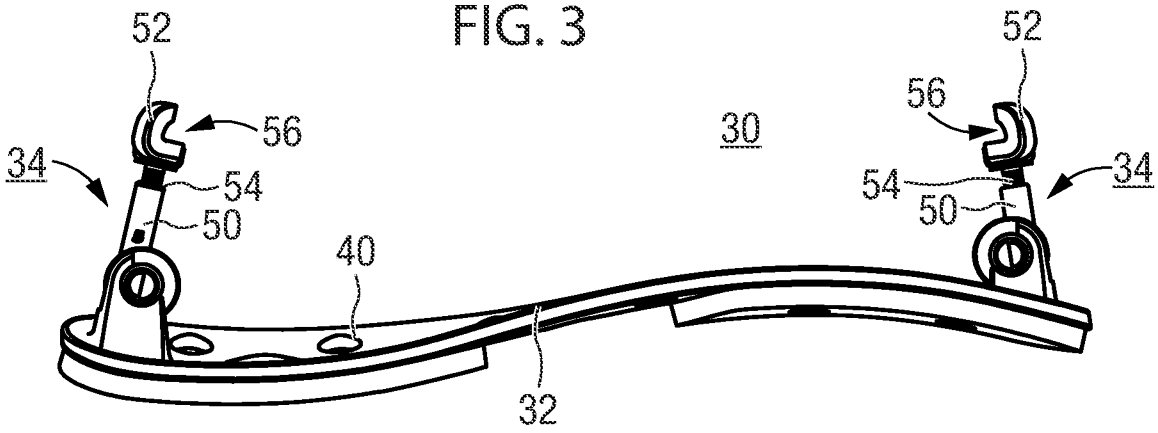
Figure 4:
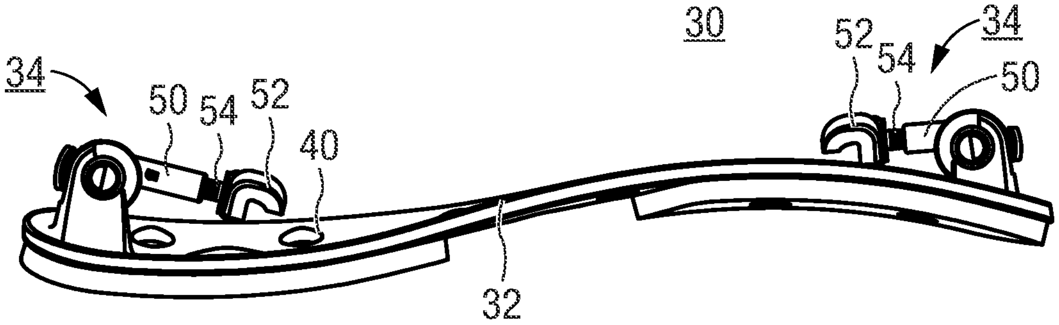

The holding system formed by the clamping units 34, with which the shoulder rest 30 is attached to the body 2 of the violin 1, is designed to be particularly suitable with regard to a plurality of design objectives. On the one hand, a particularly space-saving storage of the shoulder rest 30 should be possible when it is not in use, for example during transport in the violin case. For this purpose, the clamping units 34 are designed so that they can be swiveled or folded, as can be easily seen by comparing the illustrations in FIG. 3 (shoulder rest 30 with unfolded clamping units 34, ready for use) and FIG. 4 (shoulder rest 30 with folded clamping units 34, for stowing).

On the other hand, the holding system should also be particularly easy to adapt to different geometries, for example due to the design of the stringed instrument or violin 1 and/or the anatomical requirements of the player. To make this possible, the clamping units 34 forming the holding system are each designed in several parts; each clamping unit 34 comprises a foot or shaft 50 with an integrated internal thread, which is pivotably attached to the shoulder rest 30, and the actual holding clamp 52, which is arranged on a threaded shaft 54 and is supported by the same. The holding clamp 52 can be engaged with the circumferential bottom edge 12 of the violin 1 when the clamping unit 34 is used. To form the respective clamping unit 34, the threaded shaft 54 carrying the holding clamp 52 can be screwed into the internal thread of the respective foot or shaft 50. This design makes it particularly easy to adjust or vary the overall height of the clamping unit 34 by screwing the threaded shaft 54 more or less deeply into the internal thread of the shaft 50.

The components mentioned can be made of any suitable material. The shaft 50 is preferably made of plastic, so that a particularly lightweight construction can be represented. The head or the holding clamp 52 is preferably also made of plastic, whereby advantageously at least the contact areas 56 coming into contact with the bottom edge 12 are made of rubber or a rubberlike material.

Figure 5A:
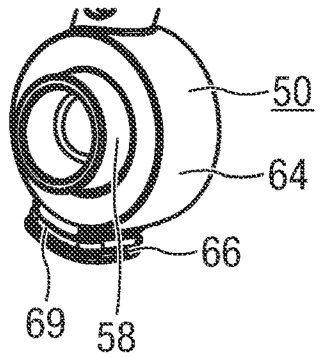
FIG. 5 shows the foot or shaft of a clamping unit in two perspective views, FIG. 6 a pivot bearing associated with the foot or shaft of a clamping unit in two perspective views.
Figure 5B:
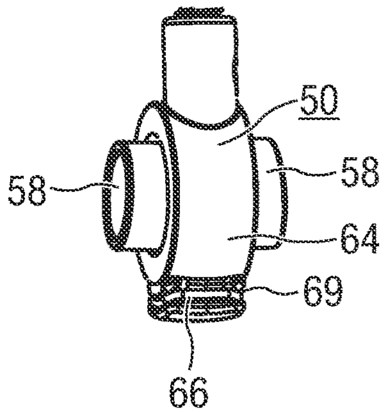
Figure 6A:
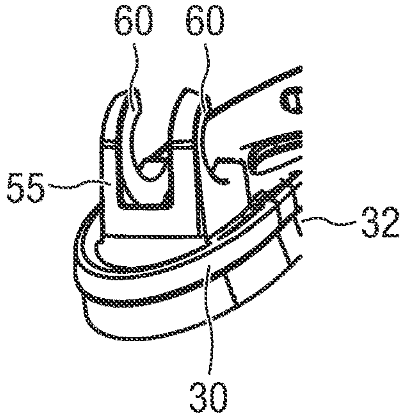
Figure 6B:
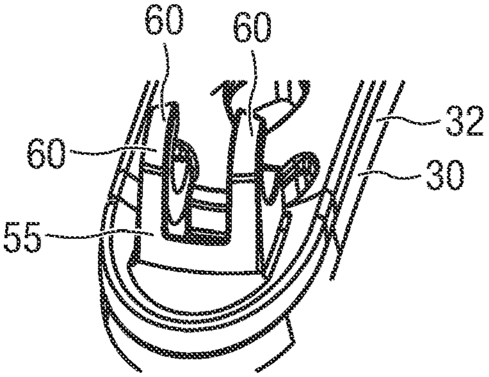
Figure 7A:
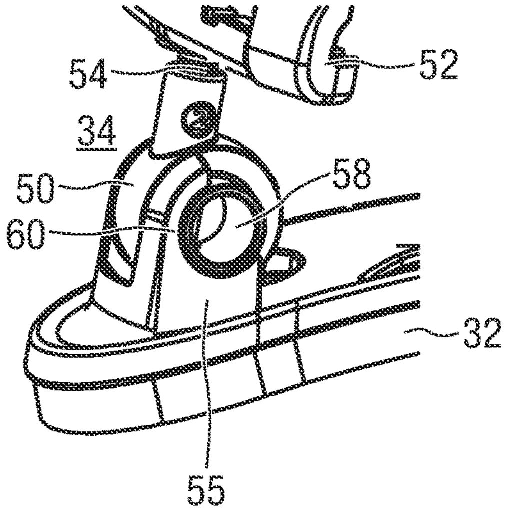
FIG. 7 shows the foot or shaft inserted into the respective pivot bearing in two perspective views.
Figure 7B:
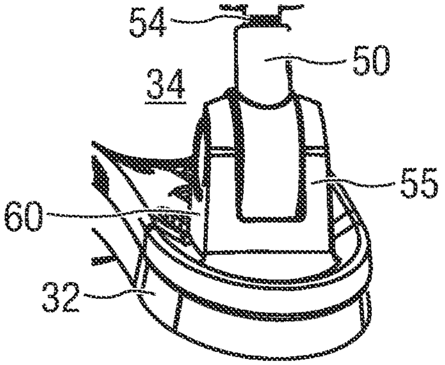
Figure 8:
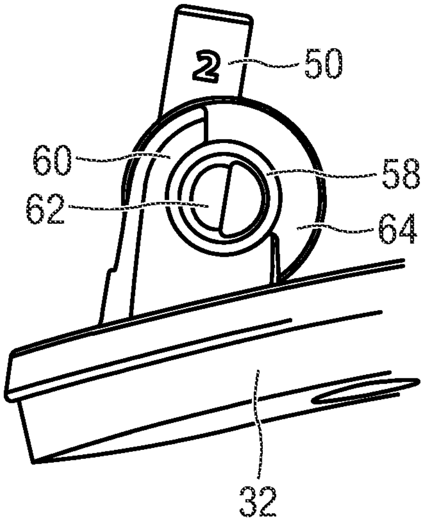
FIG. 8 shows a side view of the foot or shaft inserted in the respective pivot bearing.

The foot or shaft 50 of a clamping unit 34 provided for attachment to the shoulder rest 30 is shown in FIG. 5 in two perspective views (FIG. 5*a* and FIG. 5*b*). In order to enable the desired pivotability, the shaft 50 is rotatably mounted on the shoulder rest 30. For this purpose, FIG. 6 shows in two perspective views a pivot bearing 55 associated with the foot or shaft 50, provided for receiving it and fastened to the shoulder rest 30 (FIG. 6*a* and FIG. 6*b*). In FIG. 7, on the other hand, the assembled unit formed by foot 50 on the one hand and pivot bearing 55 on the other hand is shown in two perspective views (FIG. 7*a* and FIG. 7*b*). Furthermore, the foot or shaft 50 of a clamping unit 34 provided for attachment to the shoulder rest 30 is shown in FIG. 8 in lateral view and in FIG. 9 in section when inserted into the pivot bearing 55. The design of the individual components will now be explained further with respect to FIGS. 5 to 9.

Figure 9A:
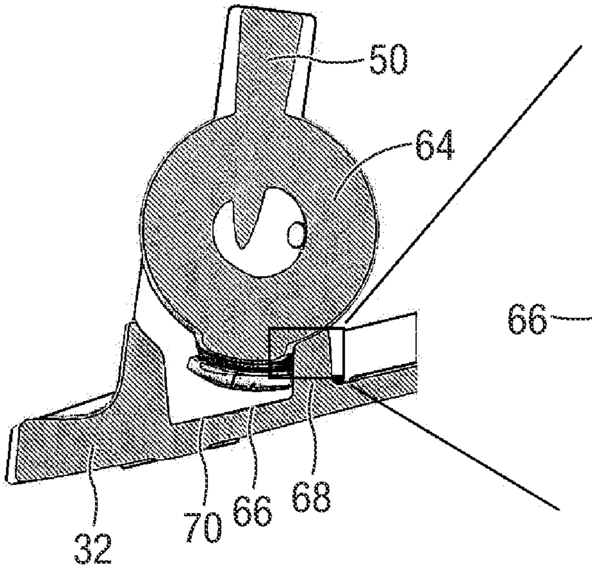
FIG. 9*a* shows the foot or shaft inserted into the respective pivot bearing in longitudinal section.

At the side of the end area of the shaft 50, a number of pivot pins 58—two in the example embodiment—are arranged, which are rotatably mounted in bearing shells 60 attached to the shoulder rest 30 about an axis of rotation 62 aligned perpendicular to the drawing plane in the illustrations according to FIGS. 8, 9. As can be seen from the illustrations in FIGS. 6 and 7 and the lateral view in FIG. 8, the bearing shell 60 is designed in the form of an arcuate segment that does not completely surround or enclose the pivot pin 58, but only over a certain arcuate length. Taking into account the elasticity of the material forming the bearing shell, preferably a plastic or synthetic material, the bearing shell 60 thereby fixes the pivot pin 58 in the inserted state, but the shaft 50 including its pivot pin 58 can be removed from the bearing formed by the bearing shell 60. This makes it particularly easy to replace or exchange the foot or shaft 50 from the bearing.

The bearing shells 60 and/or clamping units 34 are, as already mentioned, especially preferably made of plastic or a plastic material; alternatively, however, metal may preferably be selected as the base material therefor. However, the support element can also be manufactured as wood.

As can be seen from the illustrations according to FIG. 5 and also from the sectional view in FIG. 9, the shaft 50 is thickened in its actual foot area in the form of a roller body 64 with an approximately cylindrical cross-section, the two pivot pins 58 being formed on the end of this roller body 64. The roller body 64 is in turn provided with an end piece 66, which cooperates with a stopper 68 attached to the shoulder rest 30 and forms a stop for the swinging out of the shaft 50. This ensures that the clamping unit 34 is brought into a defined position when it is swiveled out and can be brought into engagement with the bottom edge 12 of the violin 1 in a correspondingly adapted manner.

In addition to the above-mentioned stop function, the end piece 66 enables very precise specification and differentiation of the angles of the shaft 50 in the opened state. For example, depending on the length of the ensemble consisting of the shaft 50 and the rubber foot, this influences how strong the leverage effect is when it is clamped to the instrument. In particular, these components should be dimensioned precisely so that, depending on how long the ensemble of shaft and rubber foot is dimensioned, they compensate for its varying leverage effect when clamped to the violin. An increased leverage effect due to a longer shaft and rubber foot should be compensated, for example, by a more inwardly inclined position of the shaft 50. This in turn is achieved by means of an end piece 66 that is individually dimensioned for each tilting leg version, in this example a wider end piece 66. A comparatively long leg is thus preferably assigned a comparatively wide end piece 66 and a short leg a narrow end piece 66. In this way, the angle in the unfolded state is integrated in the shaft element itself and is not dependent on the support itself.

The end piece 66 is in turn provided with an O-ring 70, preferably made of rubber, guided in a groove 69. On the one hand, this dampens the impact when the end piece 66 comes into contact with the stopper 68, but on the other hand, as a result of the plastic deformability of the O-ring 70, a certain elasticity of the connection and contact between the end piece 66 and the stopper 68 as such is given. As has turned out completely surprisingly, this design has an extraordinarily positive influence on the tonal quality of the ensemble to the whole, i.e., when the shoulder rest is attached to the violin by means of the clamping units 34. Due to the elasticity of the O-ring 70, via which the mechanical contact is established in the area of the stop, there are to a certain, in particular microscopic extent, resilient properties of this connection which have a very positive effect on the sound design of the instrument.

Figure 9B:
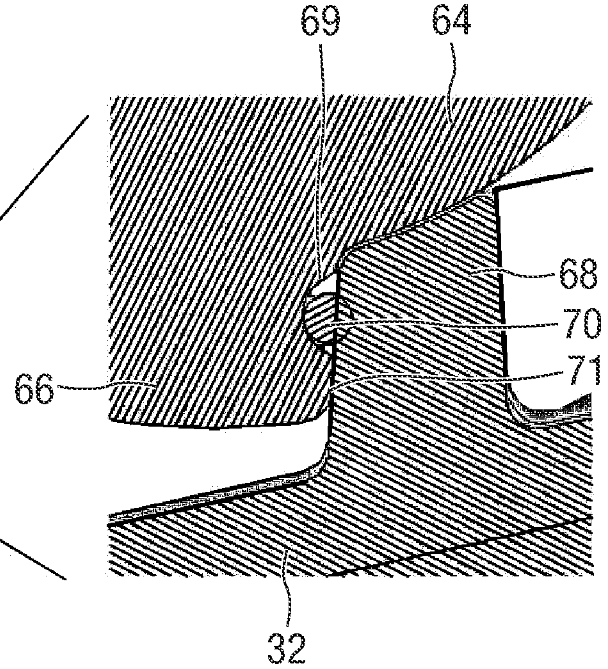
FIG. 9*b* shows a sectional enlargement of the illustration in FIG. 9*a*.

Particularly in the enlarged cross-sectional view shown in FIG. 9*b*, it can be clearly seen that the end piece 66 comes into direct contact with the stopper 68 in a contact area 71 when the shaft 50 is fully unfolded. The O-ring 70 mounted in the groove 69 is deformed accordingly within the scope of its elasticity. It is also clear from this illustration that the choice of the appropriate thickness or cord strength of the O-ring 70 is decisive for the precise characteristics of the contact between the end piece 66 and the stopper 68 in the contact area 70: if the cord strength were chosen to be very large, the O-ring 70 would deform within the scope of its elasticity until it absorbs the fully constant counterforce for fixing the shaft 50; direct contact between the end piece 66 and the stopper 68 in the contact area 71 would then not occur. If, on the other hand, the cord thickness were chosen to be very small, the O-ring 70 would be located almost completely in the groove 69, and there would not be too much deformation until the end piece came into direct contact with the stopper 68 in the contact area 71; this case corresponds to a largely undamped or unsprung mechanical contact between end piece 66 and stopper 68.

Advantageously, the primary function of the O-ring 70 is to dampen the percussion sound that can occur when the end piece 66 strikes the stopper 68 during playing of the violin and corresponding movement in the holding system. Advantageously, the components are dimensioned in such a way that the end piece 66 contacts the stopper 68 in the contact area 71 under tension. Since slight sonic vibrations can occur at this point due to the contact-related transmission of sound waves, it is additionally positive in terms of sound that the O-ring 70 is present. Surprisingly, the sound seems to be more "lively" with the O-ring than without. In view of the above considerations, advantageously the dimension or size of the O-ring 70 is suitably selected with respect to the desired properties, whereby (if the ring is too thick) an excess of "resonance" could arise or, on the other hand (if the ring is too thin), there could no longer be any damping of the impact. In particular, the cord thickness (SD) is thereby advantageously always selected so that, when the rest is clamped to the violin, the O-ring 70 is slightly compressed in such a way that the end piece 66 and the stopper 68 touch each other. A larger projection requires a softer material (lower compression resistance), and a smaller projection a harder one.

Advantageously, an O-ring 70 with a cord thickness (SD) between 0.5 and 3 mm, preferably 0.7 to 1.5 mm and particularly preferably between 0.8 and 1.2 mm is used. The compression of the cord thickness (SD) should be between (minimum) 10% and (maximum) 60%, preferably 20-50%, particularly preferably 30-40%.

In the sense of a flexible adaptability of the holding system formed by the clamping units 34 to the individual geometry of the violin 1, a certain adjustability of the clear width of the holding clamps 52 to each other when the clamping units 34 are unfolded is also desirable. Thus, it should be possible to select the clear width between the holding clamps 52 in such a way that, as far as possible, reliable engagement of the holding clamps 52 in the circumferential bottom edge 12 is possible while applying a certain, but not too great, pretension to the components. In order to be able to modify the clear width of the holding clamps 52 accordingly, the shaft 50 of the respective clamping unit 34 is guided eccentrically or off-center in the sense that the central axis 72 of the shaft 50 does not intersect the axis of rotation 62 in the fully unfolded state but passes by an offset V at a distance therefrom. In this way, modification of the clear width of the holding clamps 52 is possible in a particularly simple manner, simply by replacing the shaft elements and replacing them with an alternative shaft with a different offset V.

Figure 10:
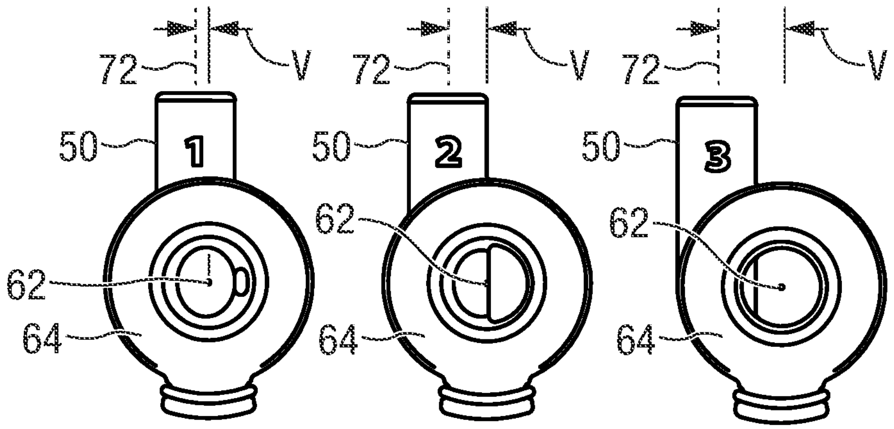
FIG. 10 shows a set of shaft elements.
Figure 11:
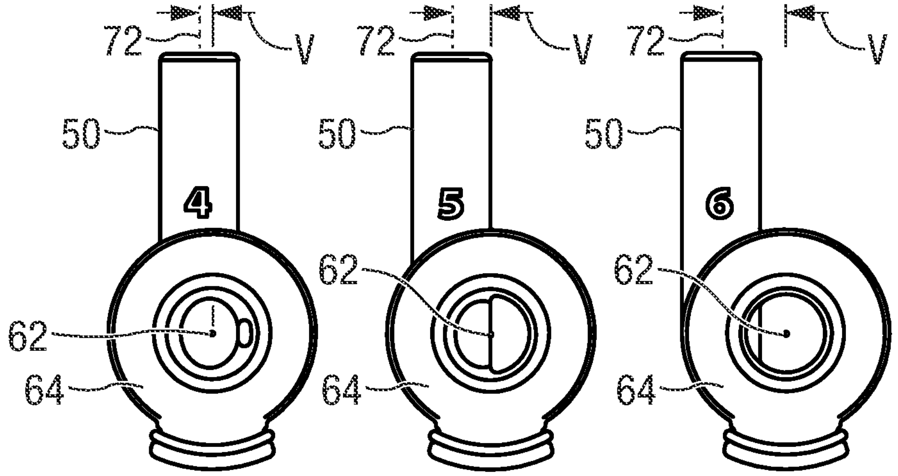
FIG. 11 shows a set of shaft elements with a different offset than the offset of the set of shaft elements of FIG. 10.

Advantageously, the shaft elements are therefore provided in the form of a set, comprising a plurality of shaft elements, each with a different offset V. Such a set of shaft elements is shown in FIG. 10 and FIG. 11 respectively, the two sets differing from each other by the length of the actual shaft 50. However, both the set shown in FIG. 10 and the set shown in FIG. 11 each comprise a foot or shaft 50 with a relatively small offset V (shown on the left), one with a medium offset V (shown in the middle) and one with a comparatively large offset V (shown on the right).

The change in the clearance between two holding clamps 52 in the unfolded state can be easily achieved by replacing the respective shaft element. In addition, however, the components are also guided out symmetrically in such a way that, in addition to a first initial position, each shaft 50 can also be mounted in a second orientation rotated by 180° about its central axis 72. Thus, the position of the central axis, starting from the original offset of +V, is shifted to the new offset of −V. Such an exchange is shown schematically in the sequence of illustrations shown in FIG. 12.

Figure 12A:
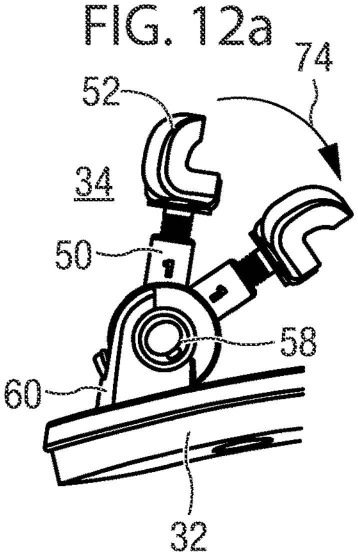
FIG. 12 shows a sequence of steps in replacing a foot or shaft in the respective pivot bearing.
Figure 12B:
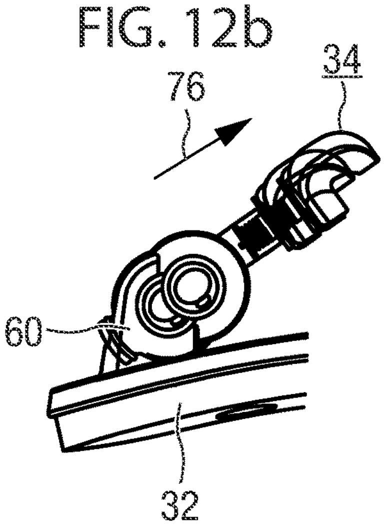

In FIG. 12*a*, it can be seen how the clamping unit 34 is swiveled from the fully unfolded position to a removal position, with the pivot pin 58 rotating accordingly in the bearing shell 60. The pivoting motion is indicated by the arrow 74 in FIG. 12*a*. In the removal position reached by the pivoting, the components then allow the removal of the clamping unit 34 from the bearing shell 60 due to their shape, as indicated by the arrow 76. The shape of the bearing shell 60, namely its design as an arc segment or arc piece only, is particularly important for the removal option.

Figure 12C:
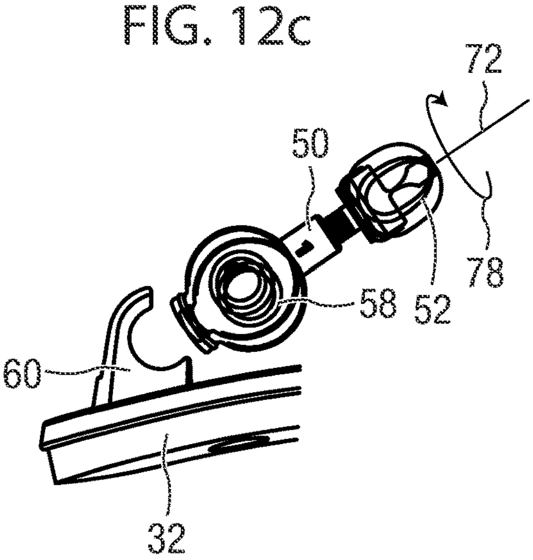
Figure 12D:
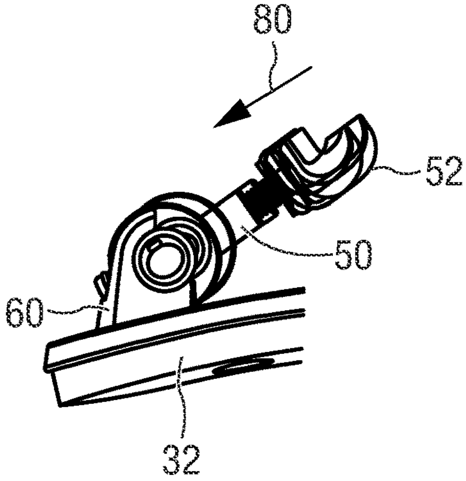
Figure 12E:
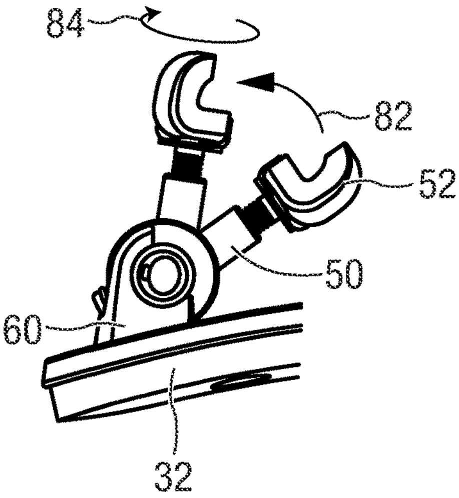

After removal, as indicated by the arrow 78 in FIG. 12*c*, the clamping unit 34 can be rotated through an angle of 180° around the central axis 72 of the shaft 50 and then, according to the illustration in FIG. 12*d*, brought back into the bearing shell 60 in the direction symbolized by the arrow 80. The clamping unit 34 is then unfolded again, as symbolized by the arrow 82 in FIG. 12*e*. Furthermore, the holding clamp 52 now initially still points in the "wrong" direction as a result of the turning, namely with its engagement side facing outward. To correct this, a further 180° rotation of the holding clamps 52 is provided by rotating the thread shaft 54 in the internal thread of the shaft 50, as symbolized by the arrow 84 in FIG. 12*e*.

Figure 13A:
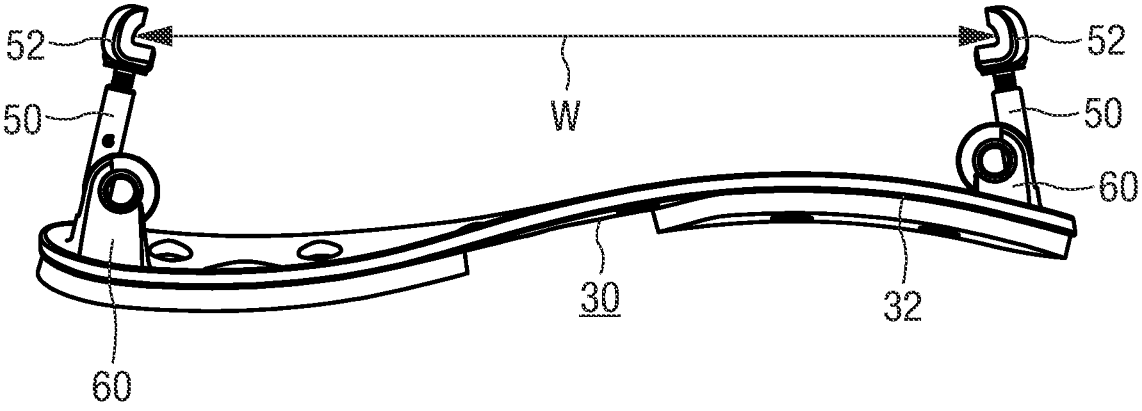
FIG. 13 shows two shoulder rests, each equipped with retaining systems, with different clear widths between their holding clamps.
Figure 13B:
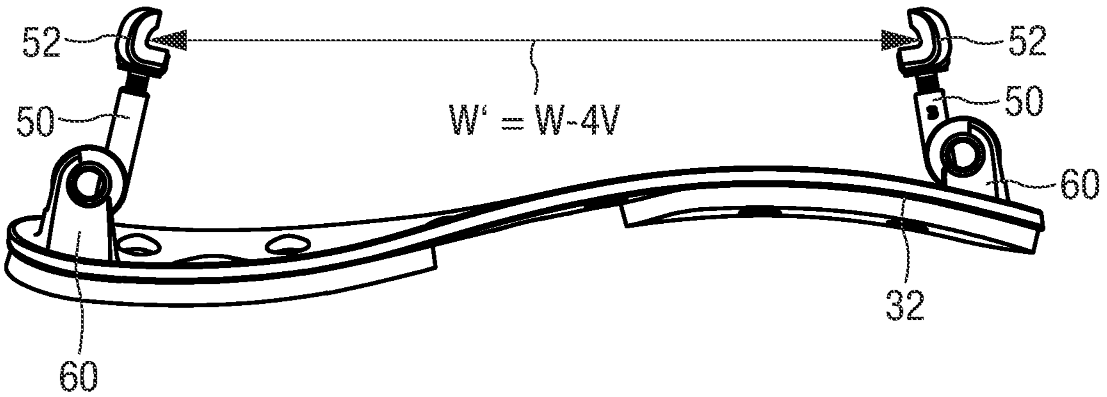

The result of such a modification, in which both clamping units 34 were rotated accordingly, is shown as an example in FIG. 13. In FIG. 13*a*, the original condition is shown in which the shafts 50 of both clamping units 34 are mounted with their offset V outward in the respective bearing shell 60, resulting in the clear width W between the holding clamps 52. In contrast, FIG. 13*b* shows the configuration after both holding elements 34 have been rotated 180° each in their respective bearing shell 60 according to the sequence shown in FIG. 12. In this configuration, they are now offset inward with respect to the respective central axis 72, resulting in a new clearance of W'=W−4V for the holding clamps 52 (for each holding clamp 52, the position changes from +V to −V, i.e. by 2V in total).

The combination of these design features provides a holding system for attaching the shoulder rest 30 to the violin 1, with which an individualized adaptation of the shoulder rest to the violin 1 and also to the individual requirements of the player is possible effortlessly and without significant effort even over large parameter ranges. The clear width W can be adjusted effortlessly according to the method described, especially when a whole set of the shaft elements is used, and the height or distance of the respective holding clamps 52 from the support element 32 can also be varied in a particularly simple manner by screwing in or out the threaded shaft 54 in the internal thread of the foot or shaft 50.

With regard to the choice of material, two designs are particularly preferred, namely on the one hand a design with 3 parts made of plastic, 2 clamping units with support element with integrated bearing shells, or on the other hand with 5 parts made of plastic/wood, 2 clamping units and bearing shells made of plastic, bearing shells mounted on support element made of wood.

LIST OF REFERENCE SIGNS

1 violin
2 body
4 neck
6 peg
8 scroll
10 body bottom
12 bottom edge
14 neck ends
16, 18 end block
20, 22 outer block
24 bulge
26 rib
30 shoulder rest
32 support element
34 clamping unit
40 holes
50 shaft
52 holding clamp
54 threaded shaft
55 pivot bearing

56 contact area
58 pivot pin
60 bearing shell
62 axis of rotation
64 roller body
66 end piece
68 stopper
69 groove
70 O-ring
71 contact area
72 central axis
74, 76, 78, 80, 82, 84 Arrow
V offset
W clearance

The invention claimed is:

1. A shoulder rest for a stringed instrument with a support element extending in a longitudinal direction for resting on the shoulder and/or chest of a player, comprising a number of hinged clamping units arranged on the support element, a shaft of each clamping unit being mounted by means of integrally formed pivot pins in an associated pivot bearing, each pivot bearing including bearing shells designed in the manner of an arc segment, wherein the bearing shells do not engage around or enclose each respective pivot pin completely but only over a certain arc length, each clamping unit further comprising a respective holding clamp disposed on and supported by a threaded shaft threadable into an internal thread integral with the shaft of the clamping unit, wherein the shaft of the respective clamping unit is guided eccentrically or off-center such that a central axis of the shaft does not intersect an axis of rotation of the respective pivot bearing in a fully unfolded state, but passes the axis of rotation spaced apart by an offset, and further comprising a set of interchangeable shaft elements having different offsets, such that a clear width between the respective holding clamps in the fully unfolded state can be varied by replacing one of the interchangeable shaft elements.

2. The shoulder rest of claim 1, wherein the shaft of each clamping unit is designed in a foot region of the shaft in the manner of a roller body with an approximately cylindrical cross-section.

3. The shoulder rest of claim 2, wherein the roller body of each clamping unit is provided with an end piece which cooperates with a stopper mounted on the shoulder rest which forms a stop for the swinging out of the shaft.

4. The shoulder rest of claim 3, wherein the end piece of the respective roller body is provided with an O-ring guided in a groove.

5. The shoulder rest of claim 4, wherein the O-ring is made of rubber.

* * * * *